(12) United States Patent
Yun

(10) Patent No.: US 10,790,479 B2
(45) Date of Patent: Sep. 29, 2020

(54) SECONDARY BATTERY AND FABRICATING METHOD THEREOF

(71) Applicant: SAMSUNG SDI CO., LTD., Yongin-si, Gyeonggi-do (KR)

(72) Inventor: Youngkwang Yun, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 790 days.

(21) Appl. No.: 14/940,519

(22) Filed: Nov. 13, 2015

(65) Prior Publication Data

US 2016/0380241 A1 Dec. 29, 2016

(30) Foreign Application Priority Data

Jun. 29, 2015 (KR) .................. 10-2015-0092172

(51) Int. Cl.
| | |
|---|---|
| *H01M 2/00* | (2006.01) |
| *H01M 2/02* | (2006.01) |
| *H01M 10/0585* | (2010.01) |
| *H01M 2/06* | (2006.01) |
| *H01M 2/16* | (2006.01) |
| *H01M 10/0525* | (2010.01) |

(52) U.S. Cl.
CPC ......... *H01M 2/021* (2013.01); *H01M 2/0275* (2013.01); *H01M 2/06* (2013.01); *H01M 2/1686* (2013.01); *H01M 10/0525* (2013.01); *H01M 10/0585* (2013.01); *H01M 2220/30* (2013.01)

(58) Field of Classification Search
CPC ...... H01M 2/021; H01M 2/0275; H01M 2/06; H01M 2/1686; H01M 10/0525; H01M 10/0585; H01M 2220/30

USPC ........................................................ 429/44
See application file for complete search history.

(56) References Cited

U.S. PATENT DOCUMENTS

| | | |
|---|---|---|
| 9,252,452 B2 | 2/2016 | Kwon et al. |
| 9,660,296 B2 | 5/2017 | Kim et al. |

(Continued)

FOREIGN PATENT DOCUMENTS

| | | |
|---|---|---|
| CN | 103081161 A | 5/2013 |
| CN | 103797636 A | 5/2014 |

(Continued)

OTHER PUBLICATIONS

Extended European Search Report dated Aug. 11, 2016 in Corresponding European Patent Application No. 16176926.0.

(Continued)

*Primary Examiner* — Nicholas P D'Aniello
(74) *Attorney, Agent, or Firm* — Lee IP Law, P.C.

(57) ABSTRACT

A secondary battery including a pouch having recessed portions inwardly recessed at at least one of opposite sides of the pouch, an electrode assembly including first electrode plates, second electrode plates and separators, the separators being disposed between the first electrode plates and second electrode plates, the electrode assembly being inside the pouch, and a lead tab coupled to the electrode assembly and exposed to the outside of the pouch. The separators protrude from the first electrode plates or the second electrode plates by different protruding lengths at different regions corresponding to the recessed portions of the pouch in a thickness direction of the electrode assembly.

8 Claims, 8 Drawing Sheets

(56) References Cited

U.S. PATENT DOCUMENTS

| | | |
|---|---|---|
| 2006/0269835 A1 | 11/2006 | Song |
| 2010/0028770 A1 | 2/2010 | Ryu et al. |
| 2012/0040235 A1* | 2/2012 | Cho .................. H01M 2/0207 |
| | | 429/156 |
| 2013/0295436 A1 | 11/2013 | Kwon et al. |
| 2013/0330606 A1* | 12/2013 | Kwon .................. H01M 2/021 |
| | | 429/185 |
| 2014/0050959 A1 | 2/2014 | Ryu et al. |
| 2014/0087224 A1 | 3/2014 | Kim et al. |
| 2014/0205879 A1 | 7/2014 | Jang et al. |
| 2014/0315074 A1 | 10/2014 | Kong |

FOREIGN PATENT DOCUMENTS

| | | |
|---|---|---|
| CN | 104272515 A | 1/2015 |
| JP | 2004-111219 A | 4/2004 |
| JP | 2013-004195 A | 1/2013 |
| KR | 10-2006-0118955 A | 11/2006 |
| KR | 10-2007-0099068 A | 10/2007 |
| KR | 10-2008-0009351 A | 1/2008 |
| KR | 10-2013-0133659 A | 12/2013 |

OTHER PUBLICATIONS

Chinese Office Action dated Dec. 26, 2019 for corresponding Chinese Patent Application No. 201610439200.6.

* cited by examiner

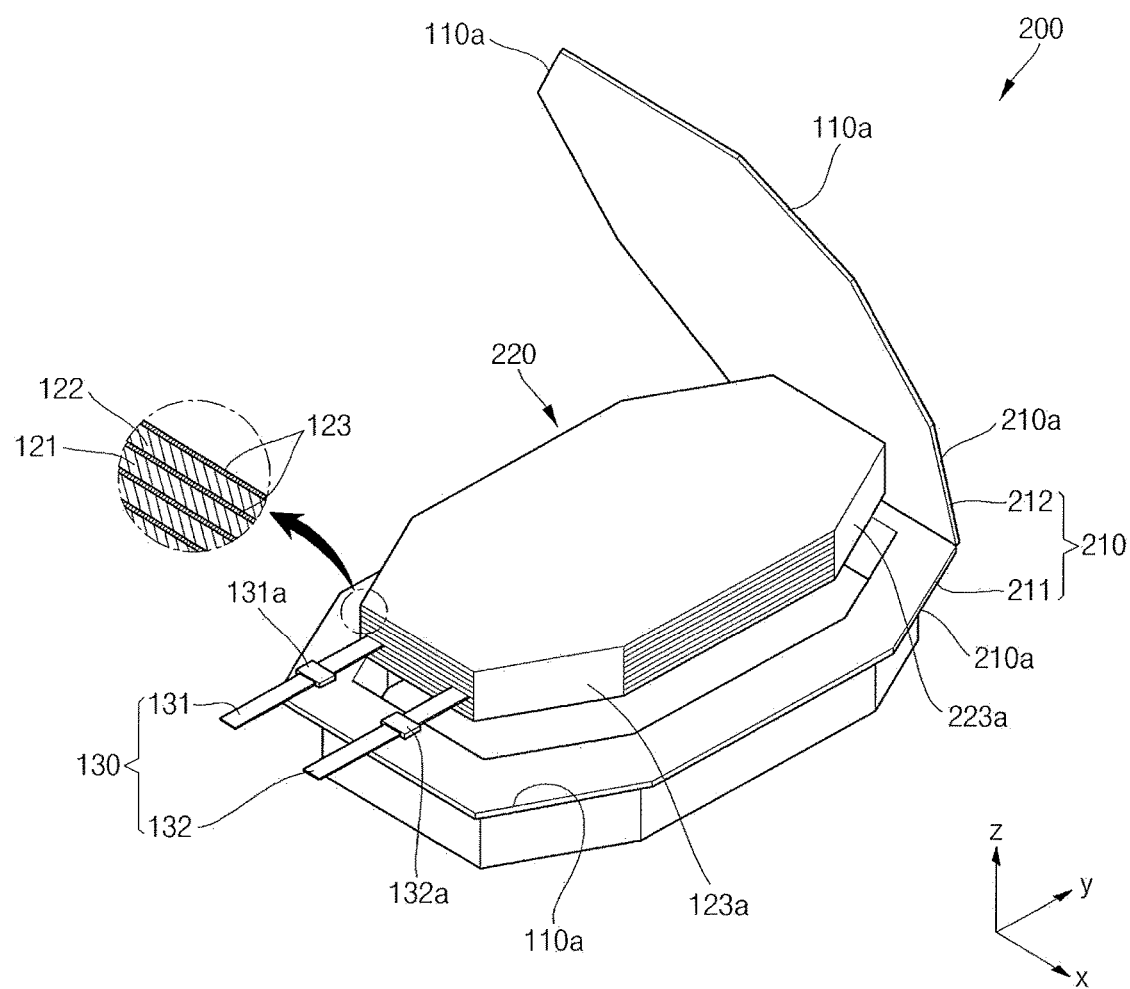

SECONDARY BATTERY AND FABRICATING METHOD THEREOF

CROSS-REFERENCE TO RELATED APPLICATION

Korean Patent Application No. 10-2015-0092172, filed on Jun. 29, 2015, in the Korean Intellectual Property Office, and entitled: "Secondary Battery and Fabricating Method Thereof," is incorporated by reference herein in its entirety.

BACKGROUND

1. Field

Embodiments relate to a secondary battery.

2. Description of the Related Art

In general, secondary batteries are batteries that can be charged and discharged and may include nickel-cadmium batteries, nickel-hydrogen batteries, or lithium batteries. Particularly, lithium secondary batteries have driving voltages of 3.6 V or more, which are three times greater than those of nickel-cadmium secondary batteries widely used as power sources for electronic devices. Further, lithium secondary batteries have relatively high energy densities per unit mass.

Lithium secondary batteries are classified into a liquid electrolyte-based battery and a polymer electrolyte-based battery according to the type of electrolyte used. A battery using a liquid electrolyte is generally referred to as a lithium ion battery and a battery using a polymer electrolyte is generally referred to as a lithium polymer battery.

In addition, the lithium secondary battery may be formed in various shapes depending on the shape of the case accommodating the electrode assembly, including a cylindrical type and a prismatic type, which are typically used for a lithium ion battery, and a pouch type, which is typically used for a lithium polymer battery.

In the pouch type lithium secondary battery, a pouch case typically includes a metal foil layer and multiple layers made of a synthetic resin. The pouch type lithium secondary battery is advantageous in that it can noticeably reduce the weight of the battery, compared to a cylindrical or prismatic lithium secondary battery using a metal can.

SUMMARY

Embodiments are directed to a secondary battery including a pouch having recessed portions inwardly recessed at at least one of opposite sides of the pouch, an electrode assembly including first electrode plates, second electrode plates and separators, the separators being disposed between the first electrode plates and second electrode plates, the electrode assembly being inside the pouch, and a lead tab coupled to the electrode assembly and exposed to the outside of the pouch. The separators protrude from the first electrode plates or the second electrode plates by different protruding lengths at different regions corresponding to the recessed portions of the pouch in a thickness direction of the electrode assembly.

The protruding lengths of the separators may gradually increase along the thickness direction of the electrode assembly.

The separators may surround lateral surfaces of the electrode assembly at the regions corresponding to the recessed portions of the pouch.

A greatest length of the separators protruding from the first electrode plates or the second electrode plates may be less than or equal to a thickness of the electrode assembly.

The separators may be formed as individual sheets stacked with the first electrode plates and the second electrode plates. The separators may be formed as a single elongated sheet that is stacked between each of the first electrode plates and the second electrode plates in a zigzag configuration.

The recessed portions may be chamfered at a region where at least one of internal angles of the pouch exceeds 90 degrees.

Embodiments are also directed to a fabricating method of a secondary battery including stacking an electrode assembly by arranging separators to be between each of first electrode plates and second electrode plates, the separators including regions protruding from the first electrode plates and the second electrode plates, cutting the regions of the separators protruding from the first electrode plates or the second electrode plates along a thickness of the electrode assembly, inserting the electrode assembly into a pouch such that portions of the regions of the separators that remain protruding from the first electrode plates or the second electrode plates after the cutting form cover portions that surround lateral surfaces of the electrode assembly.

Cutting the regions of the separators may be performed in a vertical direction along the thickness of the electrode assembly or in a direction at an angle with respect to the vertical direction.

In cutting the regions of the separators, lengths of the cover portions protruding from the first electrode plates or the second electrode plates may gradually increase in a thickness direction of the electrode assembly.

Inserting the electrode assembly into the pouch may be performed such that the cover portions are positioned between a lateral surface of the electrode assembly and the pouch.

BRIEF DESCRIPTION OF THE DRAWINGS

Features will become apparent to those of skill in the art by describing in detail exemplary embodiments with reference to the attached drawings in which:

FIG. 11 illustrates an exploded perspective view of the secondary battery illustrated in FIG. 10.

DETAILED DESCRIPTION

Figure 1:
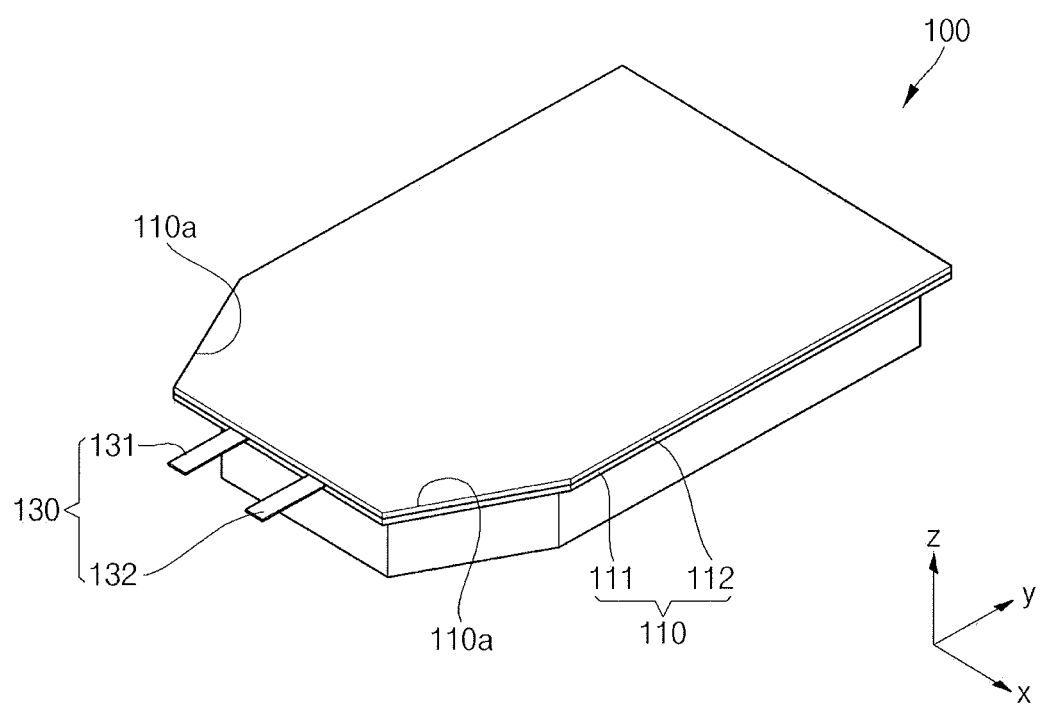
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
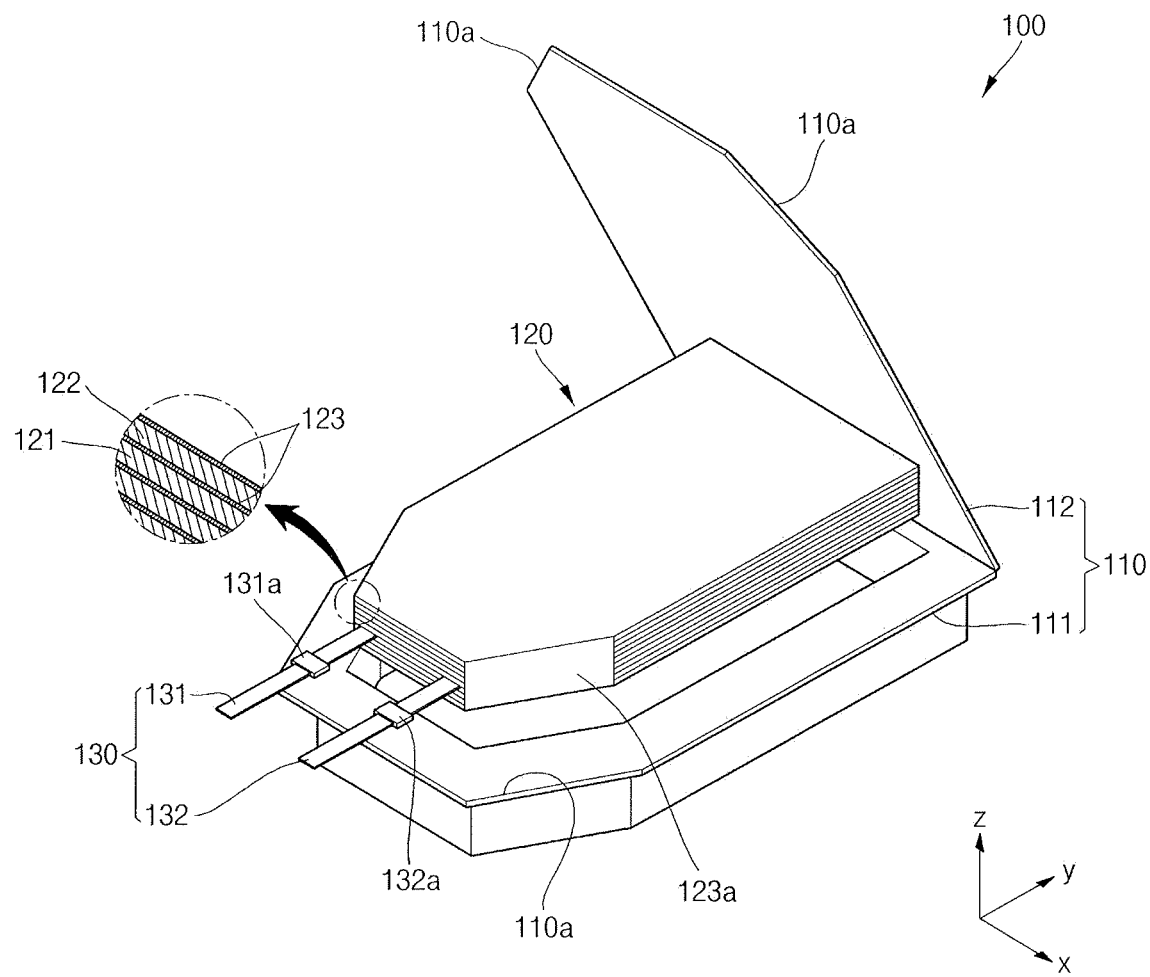
FIG. 2 illustrates an exploded perspective view of the secondary battery illustrated in FIG. 1.

FIG. 1 illustrates a perspective view of a secondary battery according to an embodiment and FIG. 2 illustrates an exploded perspective view of the secondary battery illustrated in FIG. 1.

Referring to FIGS. 1 and 2, the secondary battery 100 according to an embodiment may include a pouch 110, an electrode assembly 120 accommodated in the pouch 110, and a lead tab 130 coupled to the electrode assembly 120 and exposed to the outside of the pouch 110.

The pouch 110 may be formed as a multi-layered sheet structure. The pouch 110 may include a polymer sheet forming an internal surface and functioning to provide insulation and thermal fusion, a polyethyleneterephthalate (PET) sheet, a nylon sheet or a PET-nylon composite sheet, forming an external surface and functioning for protection, and a metal sheet providing mechanical strength. (For the sake of convenient explanation, the following description will be made with regard to "nylon sheet" by way of example.) The metal sheet may be interposed between the polymer sheet and the nylon sheet and may be formed of, for example, an aluminum sheet.

The pouch 110 may include a first case member 111 having a top opening and accommodating the electrode assembly 120 through an internal space, and a second case member 112 shaped as a substantially planar plate and sealing the first case member 111.

The second case member 112 may be combined with the first case member 111 to cover the electrode assembly 110 accommodated in the first case member 111. In this state, thermal fusion may be performed along peripheries of the first case member 111 and the second case member 112, thereby sealing the pouch 110.

When a region of the pouch 110 from which the lead tab 130 protrudes is defined as an upper region, the pouch 110 may have recessed portions 110a formed at opposite edges of the upper region. The recessed portions 110a may have chamfered corners to be inwardly recessed relative to a lower region opposite to the upper region of the pouch 110. Due to the recessed portions 110a, the pouch 110 may have a shape of a hexagon having internal angles of greater than or equal to 90 degrees in the upper region. When a device into which the secondary battery 100 according to embodiments is to be inserted has an irregular shape, such as, for example, a circular space in a case where the secondary battery 100 is employed in a circular device such as a smart watch, the secondary battery 100 may be suited to the device shape. The positions and the number of the recessed portions 110a may be variably adjusted according to the design of the device. Accordingly, the secondary battery 100 according to embodiments may be mounted in the space of devices having various shapes.

The electrode assembly 120 may be configured such that a first electrode plate 121 and a second electrode plate 122 are stacked with a separator 123 interposed therebetween. The first electrode plate 121 may be a positive electrode plate and the second electrode plate 122 may be a negative electrode plate. In some implementations, polarities of the first electrode plate 121 and the second electrode plate 122 may be reversed. For the sake of convenient explanation, the following description will be made assuming that the first electrode plate 121 is a positive electrode plate and the second electrode plate 122 is a negative electrode plate.

The electrode assembly 120 may be accommodated in the pouch 110 together with an electrolyte. The electrolyte may include an organic solvent, such as ethylene carbonate (EC), propylene carbonate (PC), diethyl carbonate (DEC), ethylmethyl carbonate (EMC), dimethyl carbonate (DMC), and a lithium salt, such as $LiPF_6$ or $LiBF_4$.

The first electrode plate 121 may be formed by coating a first electrode active material, such as, for example, a transition metal oxide, on a first current collector made of, for example, a metal foil, such as an aluminum (Al) foil. The first electrode plate 121 may include an uncoated region that is not coated with the first electrode active material. The uncoated region may function as a passage for current flowing between the first electrode plate and an exterior of the first electrode plate.

The second electrode plate 122 may be formed by coating a second electrode active material, such as, for example graphite or carbon, on a second current collector made of, for example, a metal foil, such as a copper or nickel foil. The second electrode plate 122 may include an uncoated region that is not coated with the second electrode active material.

The first electrode plate 121 and the second electrode plate 122 may have chamfered shapes to conform with the shape of an internal space of the first case member 111 of the pouch 110. For example, the first electrode plate 121 and the second electrode plate 122 may have recessed portions 121a and 122a formed at positions adaptive to the shape of the pouch 110. The first electrode plate 121 and the second electrode plate 122 may be shaped to conform with the shape of a space formed in the first case member 111 of the pouch 110 such that the electrode assembly 120 may be inserted into the pouch 110.

The separator 123, positioned between the first electrode plate 121 and the second electrode plate 122, may prevent an electric short between the first electrode plate 121 and the second electrode plate 122 and may allow only lithium ions to pass. The separator 123 may be formed from a suitable separator material such as polyethylene (PE), polypropylene (PP) or a composite film of polyethylene (PE) and polypropylene (PP).

The separator 123 may include a cover portion 123a covering the recessed portions 121a and 122a of the first electrode plate 121 and the second electrode plate 122. The cover portion 123a may be configured to surround lateral surfaces of the recessed portions 121a and 122a of the first electrode plate 121 and the second electrode plate 122, thereby helping to prevent the recessed portions 121a and 122a from directly contacting the first case member 111. The first electrode plate 121 and the second electrode plate 122 may be protected from direct contact with the first case member 111 of the pouch 110 by the cover portion 123a.

In the secondary battery 100, if the internal temperature of the pouch 110 rises, gases that may be generated from the pouch 110 and internal pressures applied due to the generated gases may concentrate on the recessed portions 121a and 122a of the first electrode plate 121 and the second electrode plate 122 having irregular shapes. The recessed portions 121a and 122a of the first electrode plate 121 and the second electrode plate 122 may be protected from such internal pressures by the cover portion 123a. The first electrode plate 121 and the second electrode plate 122 have an increased degree of freedom with respect to irregularity of shape. Accordingly, the secondary battery 100 according to an embodiment may be inserted into device spaces having various shapes.

The lead tab 130 may be electrically connected to the electrode assembly 120 and may protrude and be exposed to the outside of the pouch 110. The lead tab 130 may include first electrode tab 131 and a second electrode tab 132, which may be formed as elongated strips. The first electrode tab 131 and the second electrode tab 132 may be electrically connected to a respective one of the first electrode plate 121 and the second electrode plate 122, forming a positive electrode and a negative electrode, respectively. The first electrode tab 131 and the second electrode tab 132 may be formed by being stacked together with the electrode assembly 120 (including the first electrode plate 121, the second electrode plate 122 and the separator 123). When the first lead tab 131 is a positive electrode tab 131, the first lead tab 131 may be made of aluminum. When the second lead tab 132 is a negative electrode tab, the second lead tab 132 may be made of copper. The polarities and materials of the first lead tab 131 and the second lead tab 132 may be changed according to design choice.

Insulation members 131a and 132a may be coupled to respective regions where the first electrode tab 131 and the second electrode tab 132 intersect with the pouch 110. The insulation members 131a and 132a may electrically insulate the pouch 120 from the first electrode tab 131 and the second electrode tab 132 and may maintain a sealed state even at regions where the first electrode tab 131 and the second electrode tab 132 are present.

Hereinafter, stages of a method of forming the electrode assembly of the secondary battery according to an embodiment and inserting the electrode assembly into a pouch will be described in more detail.

Figure 3:
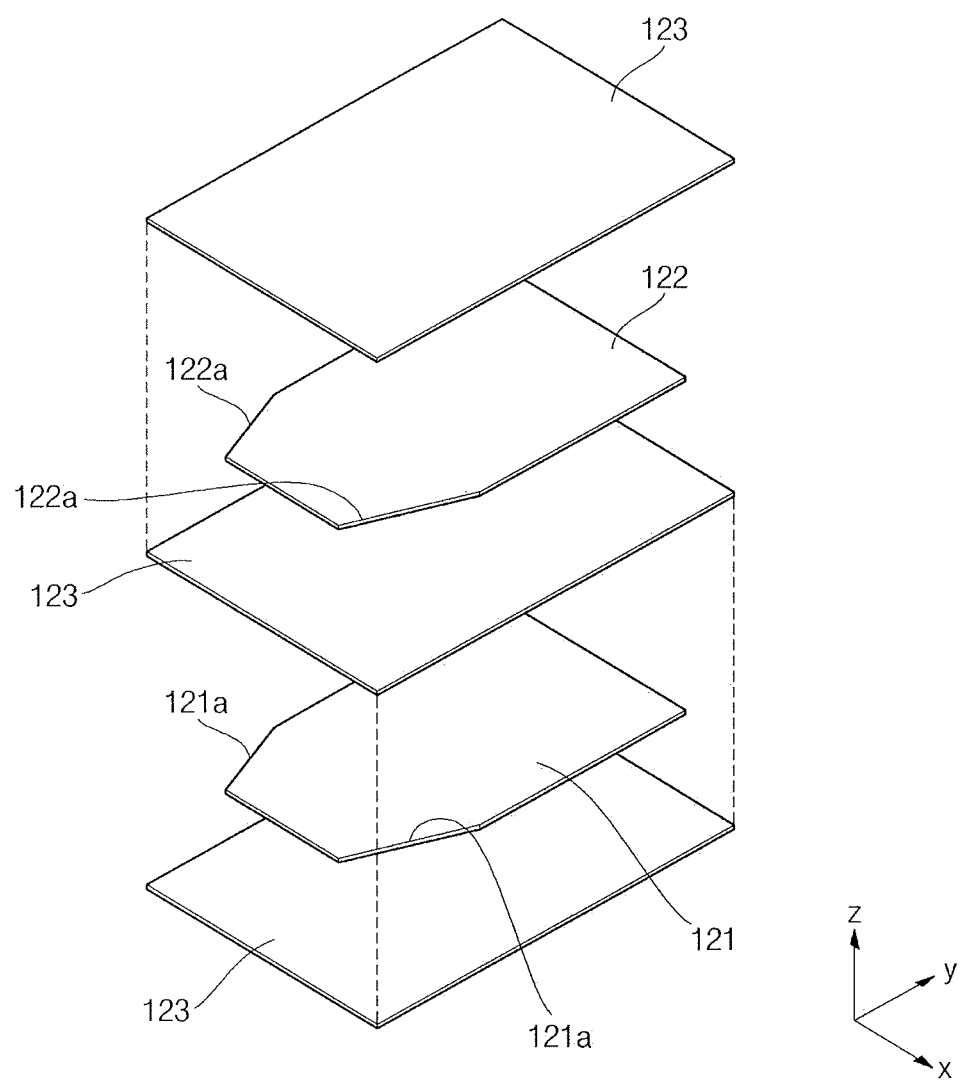
FIG. 3 illustrates an exploded perspective view depicting a stacking method of an electrode assembly of the secondary battery illustrated in FIG. 1.
Figure 4:
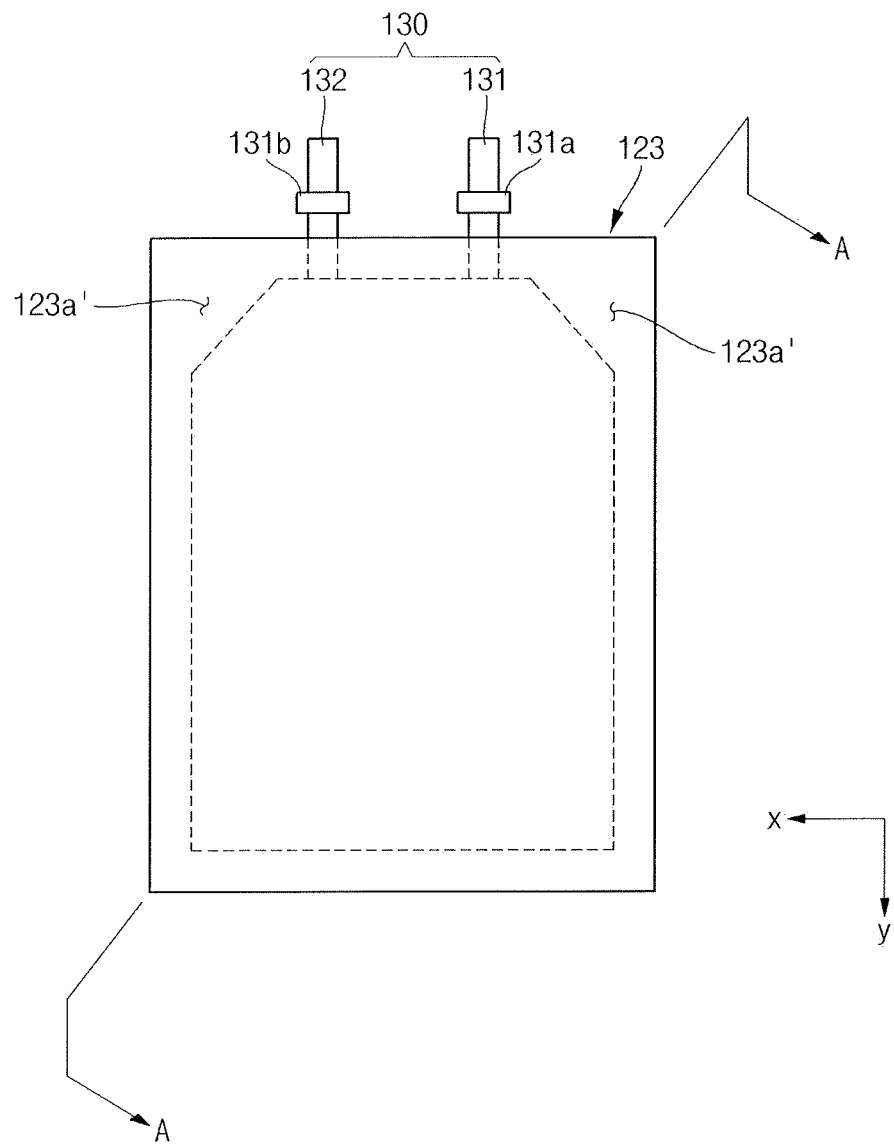
FIG. 4 illustrates a plan view depicting an electrode assembly of the secondary battery illustrated in FIG. 1.
Figure 5:
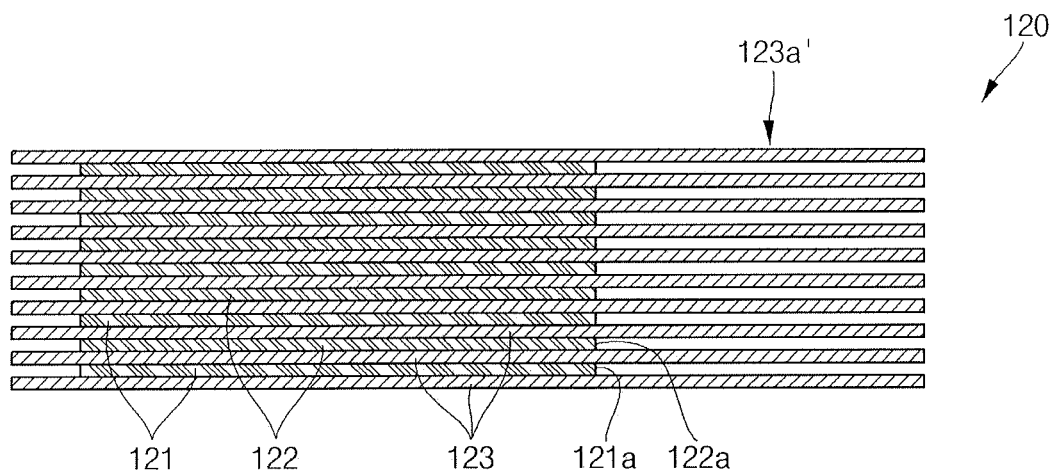
FIG. 5 illustrates a sectional view taken along the line A-A of FIG. 4.
Figure 6:
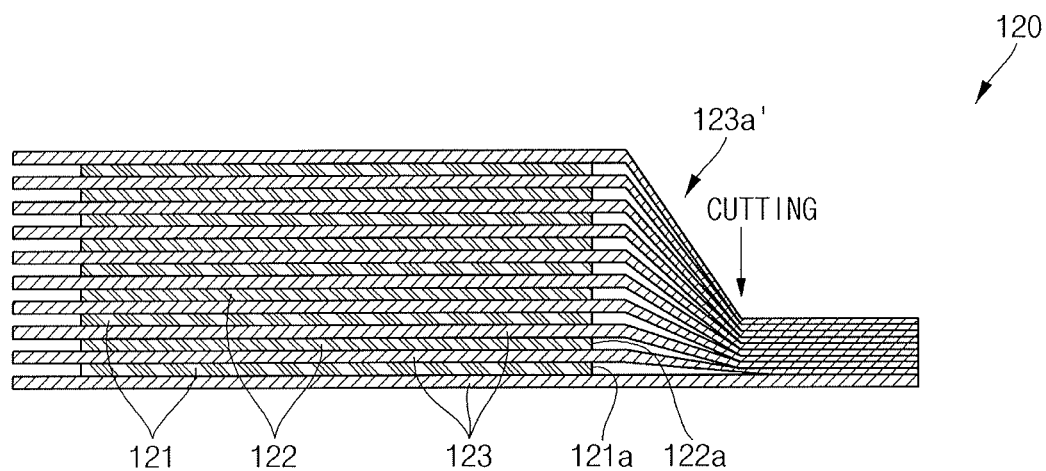
FIG. 6 illustrates a sectional view depicting a process step of cutting a separator in the electrode assembly of the secondary battery illustrated in FIG. 1.
Figure 7:
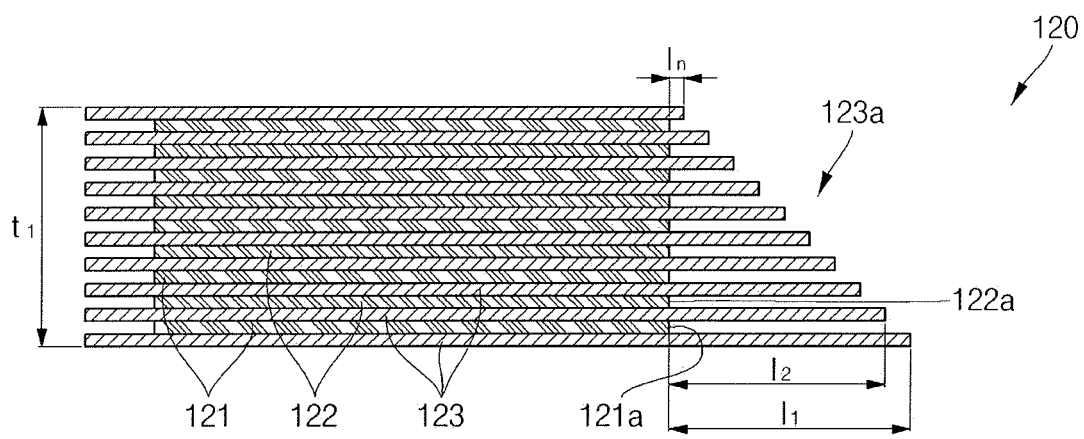
FIG. 7 illustrates a sectional view depicting the electrode assembly after the cutting illustrated in FIG. 6.
Figure 8:
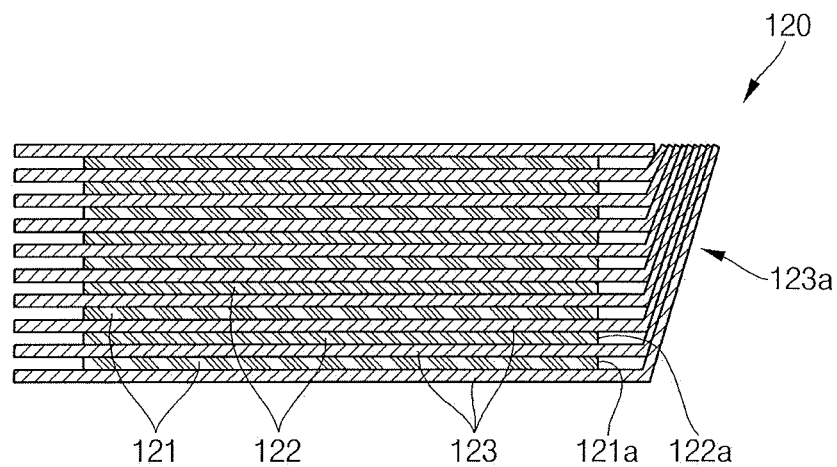
FIG. 8 illustrates a sectional view depicting a state in which a cutting portion of the separator covers a lateral surface of the electrode assembly illustrated in FIG. 7.
Figure 9:
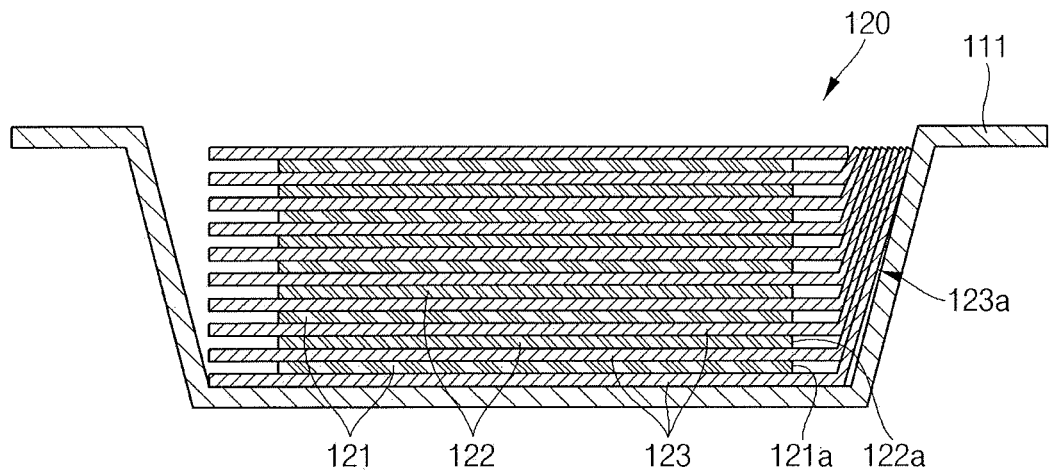
FIG. 9 illustrates a sectional view depicting a state in which the electrode assembly illustrated in FIG. 8 is mounted in a pouch.

FIG. 3 illustrates an exploded perspective view depicting a stacking method of an electrode assembly of the secondary battery illustrated in FIG. 1, FIG. 4 illustrates a plan view depicting an electrode assembly of the secondary battery illustrated in FIG. 1, FIG. 5 illustrates a sectional view taken along the line A-A of FIG. 4, FIG. 6 illustrates a sectional view depicting cutting a separator in the electrode assembly of the secondary battery illustrated in FIG. 1, FIG. 7 illustrates a sectional view depicting the electrode assembly after the cutting illustrated in FIG. 6, FIG. 8 illustrates a sectional view depicting a state in which a cutting portion of the separator covers a lateral surface of in the electrode assembly illustrated in FIG. 7, and FIG. 9 illustrates a sectional view depicting a state in which the electrode assembly illustrated in FIG. 8 is mounted in a pouch.

Referring to FIG. 3, in the secondary battery 100 according to an embodiment, the electrode assembly 120 may be formed by stacking first electrode plates 121 and second electrode plates 122 having irregular shapes with separators 123 disposed between each of the first electrode plates 121 and the second electrode plates 122. Each of the first and second electrode plates 121 and 122 may be shaped as a hexagonal plane including recessed portions 121a and 122a formed at opposite sides of the upper region of the electrode assembly 120, as described above.

The separators 123 may be formed as individual sheets to then be arranged between the first electrode plates 121 and the second electrode plates 122. In other implementations, the separators 123 may be formed as a single elongated sheet having portions indicated by a dotted line in FIG. 3 connected with each other to allow the separators 123 to pass in a zigzag manner through regions between the first electrode plates 121 and the second electrode plates 122. In either case, the separators 123 may allow the first electrode plates 121 and the second electrode plates 122 to be electrically independent of each other.

During stacking, each of the separators 123 may have a rectangular shape, rather than an irregular shape. Therefore, during the stacking, additional processes separately performed on the separator 123 may be omitted.

Referring to FIGS. 4 and 5, the stacked electrode assembly 120 may be configured such that top and bottom surfaces of the first electrode plates 121 and the second electrode plates 122, indicated by dotted lines, are covered by the separators 123. The separators 123 may cover regions corresponding to the recessed portions 121a and 122a of the first electrode plates 121 and the second electrode plates 122. The separators 123 may include protrusion parts 123a' protruding from the recessed portions 121a and 122a of the first electrode plates 121 and the second electrode plates 122.

Referring to FIG. 6, the protrusion parts 123a' of the separators 123 may be collectively cut by a cutting tool. The cutting may be performed in a vertical direction in a state in which the separators 123 are stacked. For example, the electrode assembly 120 including the separators 123 may have a thickness in a vertical direction, and the protrusion parts 123a' of the separators 123 may be cut while they are downwardly pressed, as illustrated in FIG. 6. In order to process the protrusion parts 123a' of the separators 123 so as to have appropriate lengths, the cutting may be performed using cutting various angles selected according to a choice made by one of skill in the art.

Referring to FIG. 7, a structure of the electrode assembly 120 resulting from the cutting is illustrated. When the separators 123 are collectively cut, the protrusion parts 123a' of the separators 123 may have the same structure as the above-described cover portions 123a. For example, the cover portions 123a generated from the cutting may have various lengths l1 to ln that proportionally decrease away from the bottommost structure to the topmost structure. (As can be seen in comparing FIGS. 6 and 7, the topmost cover portion 123a shown in FIG. 6 would be the bottommost cover portion shown in FIG. 7. For example, after cutting, the electrode assembly 120 may be inverted to provide the orientation shown in FIG. 7) The length of structures between the bottommost cover portion 123a and the topmost cover portion 123a may decrease in a predetermined ratio. Differences between each of the lengths may be created due to a thickness of the electrode assembly 120 when the separators 123 are collectively cut, and may be adjusted by varying the cutting angles as desired.

The length l1 of the protrusion part 123a of the bottommost separator 123 may be less than or equal to a thickness t1 of the electrode assembly 120. As will be described below, when the cover portions 123a cover the recessed portions 121a and 122a of the first electrode plate 121 and the second electrode plate 122, the length l1 of the protrusion part 123a of the bottommost separator 123 may be selected so as to not exceed the thickness t1 of the electrode assembly 120, so that the cover portions 123a will not interfere with the coupling and sealing of the second case member 112 of the pouch 110 at a top portion of the first case member 111. Accordingly, sealing of the pouch 110 may be achieved.

Referring to FIGS. 8 and 9, the cover portions 123a of the separators 123 may be upwardly bent to surround the recessed portions 121a and 122a of the first electrode plate 121 and the second electrode plate 122. In such a state, the recessed portions 121a and 122a of the first electrode plate 121 and the second electrode plate 122 may be inserted into the first case member 111 of the pouch 110. In addition, although FIG. 8 and FIG. 9 are shown as separate figures, as the electrode assembly 120 illustrated in FIG. 7 is inserted into the first case member 111, the electrode assembly illustrated in FIG. 7 may be naturally transformed at the cover portions 123a of the separators 123, yielding the electrode assembly 120 illustrated in FIG. 9. In addition, a separate tape may be applied to lateral surfaces of the cover portions 123a to be attached to a top surface of the electrode assembly 120, thereby preventing the cover portions 123a from returning to their original positions.

A top portion of the first case member 111 may be covered by the second case member 112. The first case member 111 and the second case member 112 may be fused to each other, thereby completing the overall configuration of the secondary battery 100.

As described above, according to the secondary battery 100 according to embodiments, in the electrode assembly 120 configured such that the first electrode plates 121, the second electrode plates 122 and the separators 123 are stacked, the separators 123 may be collectively cut so as to conform to irregular shapes of the first and second electrode plates 121 and 121. The cover portions 123a may be cut to have stepwise varying lengths due to a thickness of the electrode assembly 120. The thus formed cover portions 123a may cover the recessed portions 121a and 122a of the first electrode plates 121 and the second electrode plates 122, thereby protecting the recessed portions 121a and 122a in the pouch 110 and helping to prevent the recessed portions 121a and 122a from being damaged by the internal pressure of the pouch 110.

Hereinafter, a configuration of a secondary battery according to another embodiment will be described.

Figure 10:
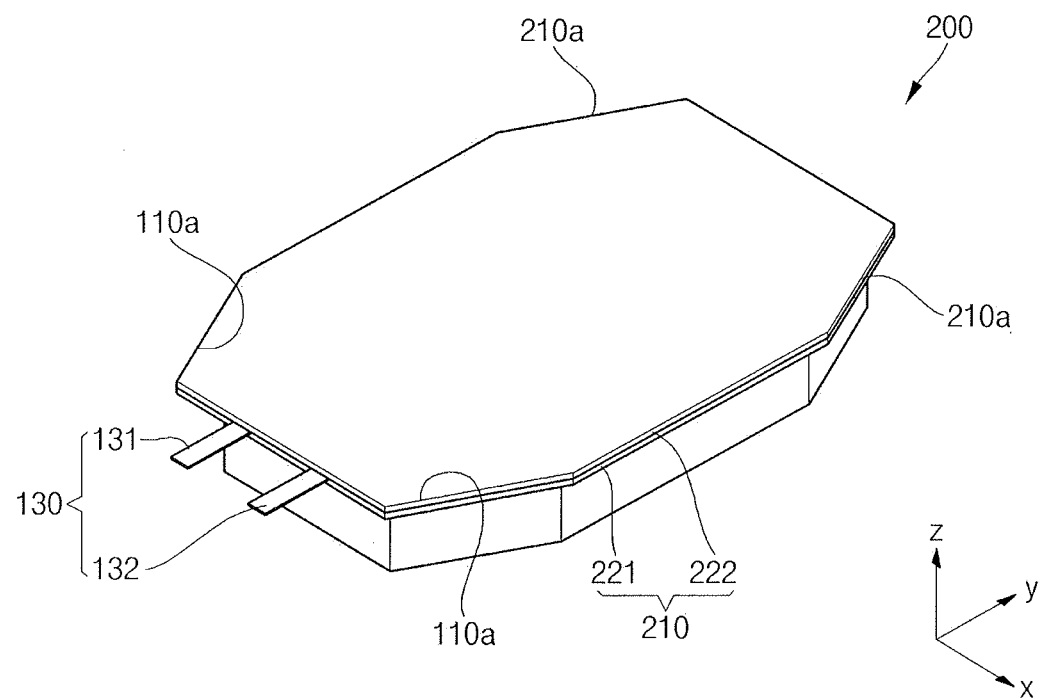
FIG. 10 illustrates a perspective view of a secondary battery according to another embodiment.

FIG. 10 illustrates a perspective view of a secondary battery according to another embodiment and FIG. 11 illustrates an exploded perspective view of the secondary battery depicted in FIG. 10. In the present embodiment, the same functional components as those of the previous embodiment are denoted by the same reference numerals, and the following description will focus on differences between the present and previous embodiments.

Referring to FIGS. 10 and 11, the secondary battery 200 according to another embodiment is fabricated may be have a substantially octagonal shape in a plan view. The secondary battery 200 may include a pouch 210, an electrode assembly 220 accommodated within the pouch 210, and a lead tab 130 coupled to the electrode assembly 220 and exposed to the outside of the pouch 210.

Like in the previous embodiment, the pouch 210 may include recessed portions 110a formed at opposite sides of a front region to which the lead tab 130 is exposed. The pouch 210 may also include recessed portions 210a formed at opposite sides of a rear region to be symmetrical with each other. Accordingly, the overall shape of the pouch 210 may be an octagon, thereby reducing waste of space when the secondary battery 200 is accommodated in a substantially circular device space.

The electrode assembly 220 may have an octagonal shape so as to conform to the shape of the pouch 210. Like in the previous embodiment, the electrode assembly 220 may also include cover portions 123a formed at opposite sides of the front region from which the lead tab 130 protrudes, and cover portions 223a formed at opposite sides of the rear region to be symmetrical with each other. Therefore, in the electrode assembly 220, the cover portions 123a and 223a may protect the recessed portions having irregular shapes.

By way of summation and review, embodiments provide a secondary battery that can be adaptively fabricated to conform with various shapes to address a requirement of a device and that exhibit improved performance from the standpoint of sealing and protection of an electrode assembly in a pouch, and a fabricating method thereof According to embodiments, in the electrode assembly configured such that first electrode plates, second electrode plates and separators are stacked, the separators may be collectively cut so as to conform with irregular shapes of the first and second electrode plates, thereby forming a cover portion having stepwise varying lengths due to a thickness of the electrode assembly. The thus-formed cover portion may cover recessed portions of the first electrode plate and the second electrode plate, thereby protecting the recessed portions in a pouch and helping to prevent the recessed portions from being damaged by the internal pressure of the pouch.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
a pouch having recessed portions inwardly recessed at opposite sides of the pouch;
an electrode assembly inside the pouch, the electrode assembly including first electrode plates and second electrode plates, the first electrode plates and the second electrode plates having a same shape such that lateral surfaces of the first electrode plates and the second electrode plates are aligned on a same plane along a thickness direction of the electrode assembly, and the first electrode plates and the second electrode plates having recessed portions in a plan view that are recessed in a direction perpendicular to the thickness direction of the electrode assembly such that the lateral surfaces of the first electrode plates and the second electrode plates face and correspond to the recessed portions of the pouch, and separators, the separators being in a form of individual sheets that are each stacked between respective ones of the first electrode plates and second electrode plates, wherein the separators protrude from the recessed portions of the first electrode plates and the second electrode plates, and
a lead tab coupled to the electrode assembly and exposed to the outside of the pouch,
wherein:
the separators protrude from the first electrode plates and the second electrode plates by different protruding lengths at different regions corresponding to the recessed portions of the pouch in the thickness direction of the electrode assembly, and the protruding lengths of the separators surround the lateral surfaces of the electrode assembly at the regions corresponding to the recessed portions of the pouch.

2. The secondary battery as claimed in claim 1, wherein the protruding lengths of the separators gradually increase along the thickness direction of the electrode assembly.

3. The secondary battery as claimed in claim 1, wherein a greatest length of the separators protruding from the first electrode plates and the second electrode plates is less than or equal to a thickness of the electrode assembly.

4. The secondary battery as claimed in claim 1, wherein the recessed portions are chamfered at a region where at least one of internal angles of the pouch exceeds 90 degrees.

5. A method of fabricating the secondary battery as claimed in claim 1, the method comprising:

stacking an electrode assembly by arranging separators to be between each of first electrode plates and second electrode plates, the separators including regions protruding from the first electrode plates and the second electrode plates;

cutting the regions of the separators protruding from the first electrode plates and the second electrode plates along the thickness of the electrode assembly; and inserting the electrode assembly into a pouch such that portions of the regions of the separators that remain protruding from the first electrode plates and the second electrode plates after the cutting form cover portions that surround the lateral surfaces of the electrode assembly.

6. The fabricating method as claimed in claim 5, wherein cutting the regions of the separators is performed in a vertical direction along the thickness of the electrode assembly or in a direction at an angle with respect to the vertical direction.

7. The fabricating method as claimed in claim 5, wherein in cutting the regions of the separators, lengths of the cover portions protruding from the first electrode plates and the second electrode plates gradually increase in a thickness direction of the electrode assembly.

8. The fabricating method as claimed in claim 5, wherein inserting the electrode assembly into the pouch is performed such that the cover portions are positioned between a lateral surface of the electrode assembly and the pouch.

* * * * *